United States Patent [19]

Gravert

[11] 4,226,023

[45] Oct. 7, 1980

[54] PORTABLE DEVICE FOR DETERMINING PHYSICAL QUALITIES OF PRESSURIZED CONTAINER CONTENTS

[75] Inventor: William H. Gravert, Port Washington, N.Y.

[73] Assignee: Marine Moisture Control Company, Inc., Inwood, N.Y.

[21] Appl. No.: 29,134

[22] Filed: Apr. 11, 1979

[51] Int. Cl.³ .............................................. G01F 23/04
[52] U.S. Cl. ...................................... 33/126.5; 73/86
[58] Field of Search ............ 33/126.5, 126.6, 126.7 R, 33/126.7 A, 126.4; 73/86

[56] References Cited

U.S. PATENT DOCUMENTS

| 1,651,956 | 12/1927 | Krammer . | |
|---|---|---|---|
| 2,006,301 | 6/1935 | Meyer . | |
| 2,131,868 | 10/1938 | Bolton et al. . | |
| 2,200,630 | 5/1940 | McCabe . | |
| 2,226,060 | 12/1940 | Johnson, Jr. . | |
| 2,265,736 | 12/1941 | Larson . | |
| 2,284,396 | 5/1942 | Pfeiffer | 33/126.7 |
| 2,324,698 | 7/1943 | Hart . | |
| 2,677,427 | 5/1954 | McKinney et al. . | |
| 2,870,629 | 1/1959 | Willis | 73/86 |
| 3,718,034 | 2/1973 | Swearingen | 73/86 |
| 4,123,753 | 10/1978 | Gravert . | |

FOREIGN PATENT DOCUMENTS 1006765  1/1952  France ...................................... 33/126

Primary Examiner—William D. Martin, Jr.
Attorney, Agent, or Firm—Harold L. Stowell

[57] ABSTRACT

A portable device is provided for determining the physical qualities, such as amount, ullage, temperature, etc., of liquids in closed tanks containing the liquid and vapors of the liquid and/or an inert gas above the liquid without lowering the pressure or allowing the pressurizing gas or vapors to escape to the atmosphere.

5 Claims, 4 Drawing Figures

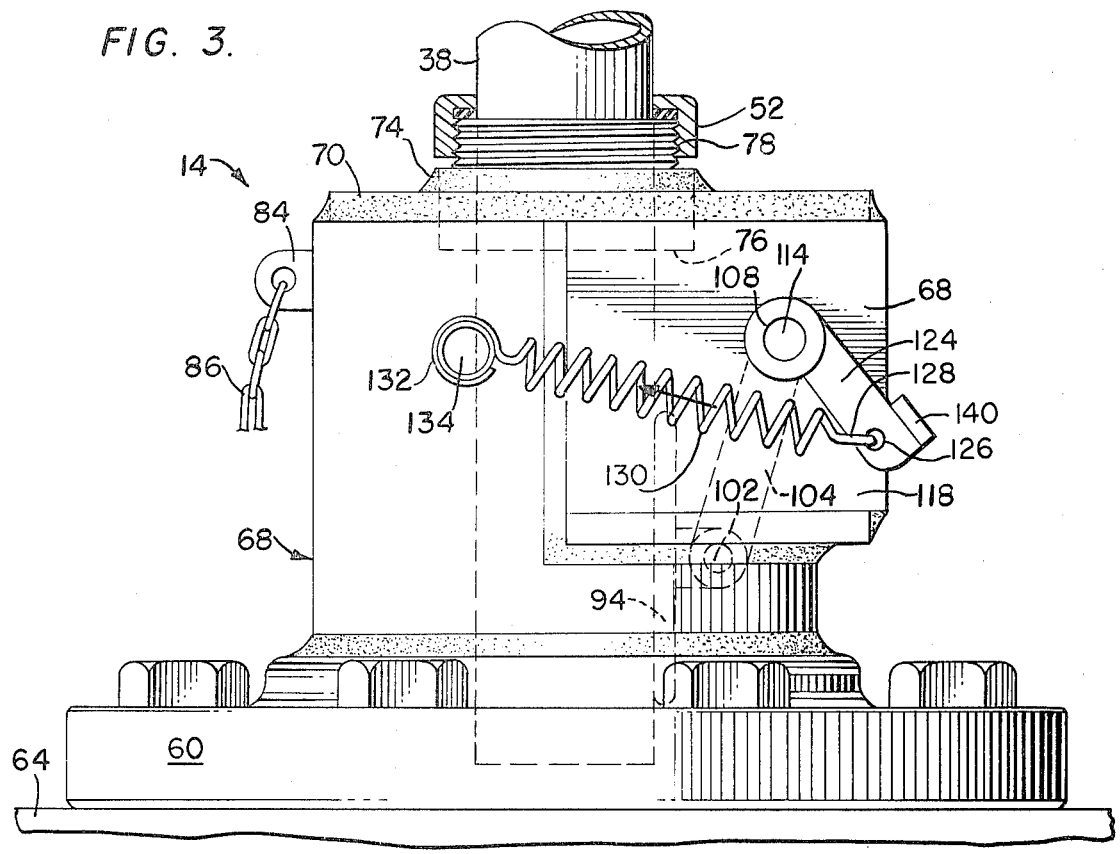
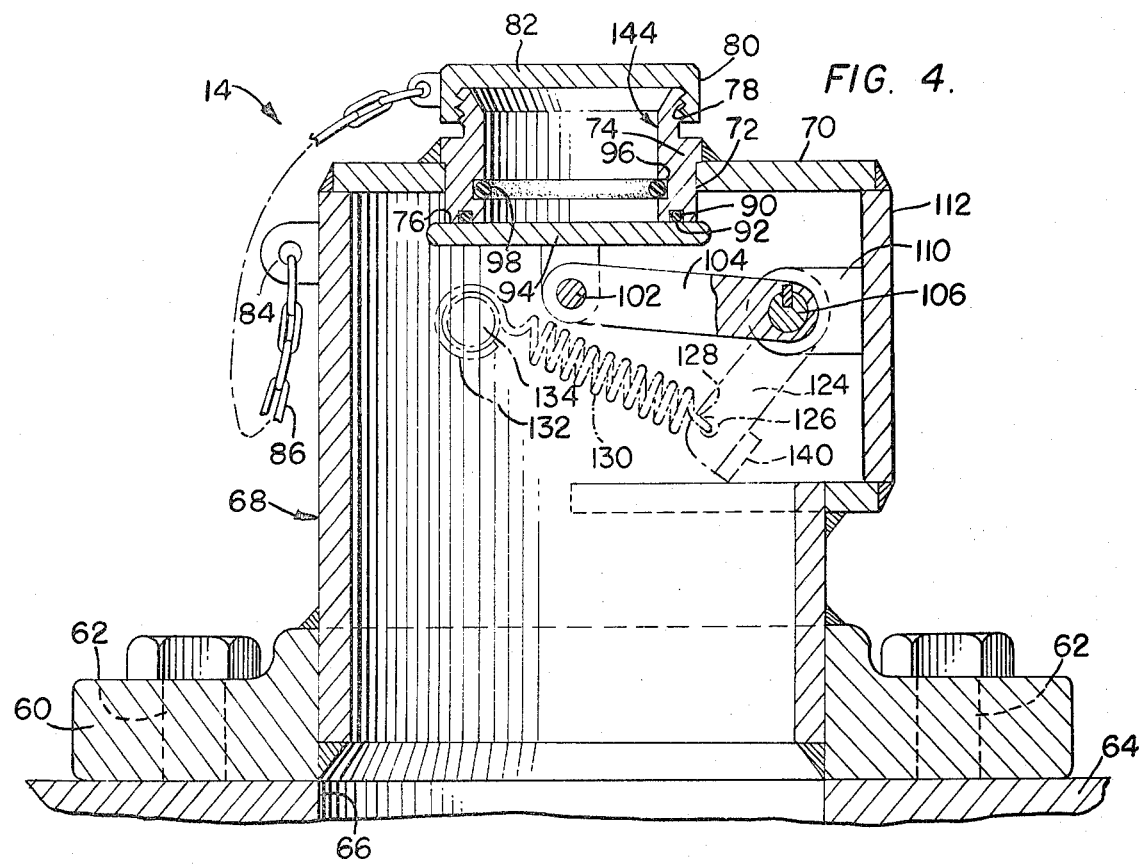

PORTABLE DEVICE FOR DETERMINING PHYSICAL QUALITIES OF PRESSURIZED CONTAINER CONTENTS

DESCRIPTION

1. Technical Field

This invention is directed to a system for hand gauging, including determining ullage, interface and temperature of liquids in pressurized tanks and containers without lowering the pressure or allowing vapors to escape to the atmosphere.

2. Background of Prior Art

The transporting of petroleum products on tankships requires gauging the tanks on loading and before discharge to determine the quantities of product transported. The large quantities involved with their high costs eliminate the use of automatic gauging systems due to their large errors. The transfer of cargo is based on physical ullages measured with a tape by an independent gauger.

Portable ullage measuring devices providing a method of finding the surface of a liquid in a tank without visual sighting are well known and reference is made to my U.S. Pat. No. 4,123,753—W. H. Gravert, disclosing an accurate form of such device.

Ecology and vessel safety have added inert gas with closed loading and discharge practices to the transportation of cargos. The new inert gas system pressure the cargo tanks, making it impossible to gauge a tank through the ullage port without first lowering the inert gas pressure. The excess inert gas and petroleum vapors are vented to atmosphere, then the tank is gauged by a hand tape using the edge of the ullage port as the standard reference. It is from this edge that the tank volume is calibrated.

It is also known to gauge and sample contents of pressurized tanks and reference is made to U.S. Pat. No. 2,284,396—W. Pfeiffer.

Systems such as disclosed in the Pfeiffer Patent require expensive duplication at each ullage port, or the transporting of a portion of heavy cumbersome equipment between ullage ports.

BRIEF SUMMARY OF INVENTION

It has now been conceived a relatively large weight, accurate and economical system to hand gauge a pressurized cargo tank without lowering the pressure or allowing vapors to escape to the atmosphere.

The invention may be summarized as apparatus for gauging liquids in pressurized tanks having at least one sealable outlet port comprising in combination a portable hand held measuring device and a valve housing assembly secured to the tank outlet port at each station to be gauged, the hand held measuring device comprising:

(a) a reel housing having a hand hold thereon;
(b) a fluid responsive device;
(c) a tape reel mechanism including a tape assembly having one end coupled with the fluid response device and the other end coupled with the tape reel mechanism;
(d) a second elongate hollow housing carried by the reel housing; the second housing adapted to receive a portion of the tape assembly and the fluid responsive device;
(e) means at the upper end of the second housing providing a gas seal for the tape assembly; and
(f) a stuffing nut engaging the external surface of the second housing; the valve housing assembly comprising:
 (1) means at the lower end therefor for sealing engagement with a tank outlet port;
 (2) an externally threaded neck at the opposite end of the valve housing sized to be engaged by the stuffing nut carried by the second housing;
 (3) a valve seat at the inner end of the neck;
 (4) a valve cap;
 (5) means pivotally mounting the valve cap within the valve housing for movement into seating engagement with the valve seat to a position to permit entry of a portion of the second housing into the valve housing; and
 (6) means urging the valve cap into sealing engagement with the valve seat.

BRIEF DESCRIPTION OF DRAWINGS

The invention will be more particularly described in reference to the accompanying drawing wherein:

FIG. 3 is an enlarged side elevational view of the valve housing assembly; and

FIG. 4 is a section on line 4—4 of FIG. 3 with the auxiliary sealing cap removed.

DETAILED DESCRIPTION OF INVENTION

Figure 1:
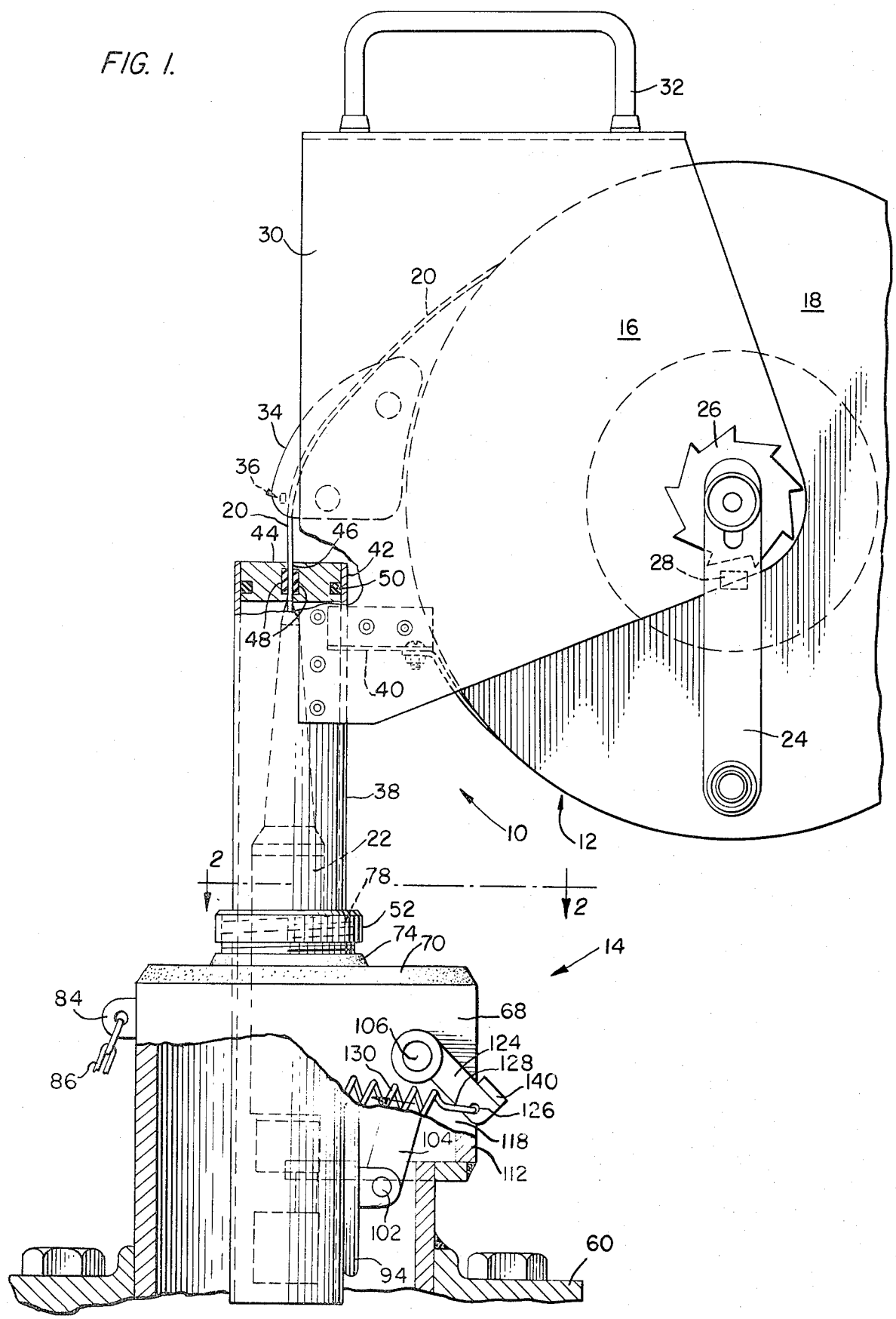
FIG. 1 is a side elevational view in partial section illustrating the apparatus for gauging liquids in pressurized tanks.
Figure 2:
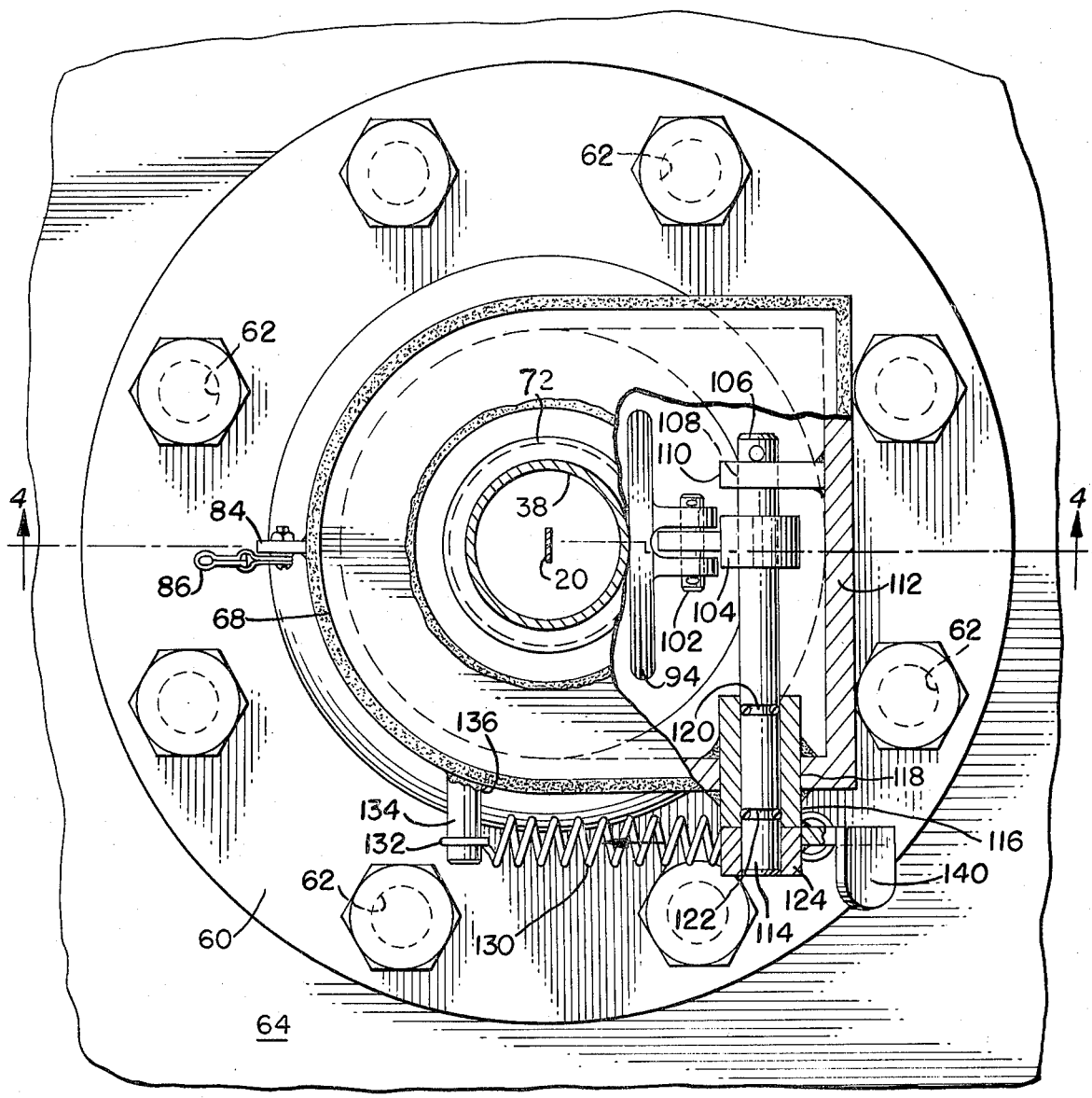
FIG. 2 is a section on line 2—2 of FIG. 1.

Referring to the drawing, 10 generally designates apparatus of the invention for gauging liquids in pressurized tanks having at least one sealable outlet port. As used herein, gauging liquids is intended to mean determining the ullage, the interface level of the contents of tanks, and the temperature of the contents at preselected levels and the like to define the total tank envelope, gross tank volume, and the like.

The apparatus of the invention includes in combination a portable hand held measuring device 12, and a valve housing assembly 14.

Hand Held Measuring Device

The hand held measuring device 12 includes a reel housing 12 having contained therein a reel mechanism 18 to which is attached one end of a tape assembly 20. The other end of the tape assembly is secured to the measuring or gauging device, or devices 22, which in the illustrated form of the invention comprises a sonic ullage measuring device which may be of the type disclosed and claimed in my U.S. Pat. No. 4,123,753 granted Oct. 31, 1978.

The reel mechanism 18, and in turn the tape 20 is controlled by the operator via a crank 24 which is slidably mounted on the reel shaft to provide locking means for the reel via star wheel 26 and locking lug 28. The measuring device 12 has attached to a portion 30 of the housing a hand carrying and steadying handle mechanism 32. Further, where the tape 20 pays out of the reel housing 16 is provided a tape guide 34 provided with a marker 36 which is designed to provide a point for reading ullage from the indicia appearing on the tape 20. The reel housing 16 also supports an elongate hollow second housing designated 38 via support arms 40. As particularly illustrated in FIG. 1 the tape 20 feeds through the interior of the second housing 38 having at its upper end 42 a sealing plug 44 having an opening therethrough as at 46. The sidewalls of the opening 46 have soft resilient inserts 48 engaging the surfaces of the tape 20 to thereby provide a gas seal for the tape without materially restricting the feed of the tape. The closure 44 is preferably provided with an O-ring 50 which provides a pressure seal at the upper end of the housing 38. The length of the housing 38 is such that it will completely enclose the particular measuring device 22 therein when the tape is reeled upon the reel mechanism 18. Mounted on the external surface of the housing 38 is a stuffing nut 52 having internal threads the function of which will become more apparent hereinafter.

Valve Housing Assembly

The valve housing assembly includes a flange plate 60 provided with a plurality of openings 62 therein which received suitable studs or bolts for attaching the valve housing to the tank 64 which may comprise a portion of the deck of a tanker, generally designated 64. The flange plate 60 is secured to the decking 64 over an opening 66 in the deck. Welded to the flange 60 is an upstanding housing 68 closed by a cover plate 70 welded thereto. The cover plate 70 has an opening 72 therein which opening is surrounded by a threaded neck 74 on the top side and a valve seat member 76 on the lower side.

The threads 78 on the neck 74 mate with the internal threads in the stuffing nut 52. The threads also mate with internal threads 80 on closure cap 82 connected to an ear 84 welded to the housing 68 via a chain or the like 86. The valve seat 76 is provided with a circular groove 90 which receives an O-ring 92 to provide a seal when the valve plate 94 is in engagement therewith. A further groove 96 is provided in the bore 72 or the valve seat 76, or the neck portion 74, which groove receives a further O-ring 98 to form a seal between the opening 72 and the external surface of the housing 38 when the housing is inserted into the upstanding member 74.

O-ring 96 is located above valve plate 94 to form a gas seal with housing 38 before housing 38 press open valve plate 94. The valve plate 94 is pivotally mounted on a pin 102 carried by a pivot arm 104. The pivot arm 104 is keyed to a shaft 106 which shaft is mounted internally in a bore 108 in an ear 110 welded to side plate 112 of the housing 68.

The opposite end 114 of the shaft 106 is received in a sleeve bearing element 116 which sleeve bearing element is welded in side plate 118 of the housing structure 68. The shaft 106 is provided with a pair of grooves 120 and 122 which receive O-rings to provide a pressure seal where the shaft 106 passes through the housing wall. The outer most end of the shaft 106 has keyed thereto a lever arm 124 which lever arm is bored as at 126 to receive end 128 of helical spring 130. The opposite end 132 of the helical spring 130 is received by a pin 134 welded as at 136 to the side wall of the housing 68. The helical spring continuously urges the arm 124 to rotate shaft 106 and its attached lever arm 104 to the valve closed position with the valve cap 94 in sealing engagement with the O-ring 92.

The lever arm 124 is also provided with a plate 140 whereby the shaft 106 can be rotated to the valve open or valve close positions.

In operation of the tank measuring device of the invention affixed to the tape 20 is the desired measuring device 22. The cap 82 is removed from the external threads 78 of the neck 74 and the operator presses the cylindrical housing 38 into the neck to seal against the O-ring 98. Continued downward motion after contact between the lower edge 144 with the upper surface of the valve cap 94 forces the valve cap downwardly against the tension in spring 130. Downward motion is continued until the valve is fully opened and the stuffing nut 52 is tightened on the threads 78. The measuring device can now be lowered into the tank to be measured by the hand crank 24 and appropriate readings obtained. To remove the tape reel element 12 a reverse procedure is followed, and after the stuffing nut 52 is unthreaded from the threaded neck 74 the tube 38 and its attached reel assembly are lifted from the housing 68 and in so doing spring 130 causes the valve cap 94 to move upwardly and finally to seal against the O-ring 92.

It will be recognized that with the O-ring seals 92, 98, and 50 and tape seal 48, the operator and the environment are protected against pressure gases and vapors maintained in the tank to be measured.

STATEMENT OF INDUSTRIAL APPLICATION

The present invention provides means whereby tanks pressurized by inert gases or under pressure by vaporized hydrocarbons may be measured without reducing the pressure within the tank.

I claim:

1. Apparatus for gauging liquid in pressurized tanks having at least one sealable outlet port comprising in combination a portable hand held measuring device and a valve housing assembly secured to the tank outlet port at each station to be gauged, said hand held measuring device comprising:
   (a) a reel housing having a hand hold thereon;
   (b) a fluid responsive device;
   (c) a tape reel mechanism including a tape assembly having one end coupled with the fluid response device and the other end coupled with said tape reel mechanism;
   (d) a second elongate hollow housing carried by the reel housing; said housing adapted to receive a portion of the tape assembly and the fluid responsive device;
   (e) means at the upper end of the second housing providing a gas seal for the tape assembly; and
   (f) a stuffing nut engaging the external surface of the second housing; said valve housing assembly comprising:
      (1) means at the lower end therefor for sealing engagement with a tank outlet port;
      (2) an externally threaded neck at the opposite end of the valve housing sized to be engaged by the stuffing nut carried by the second housing;
      (3) an axial bore through the externally threaded neck, said axial bore having a diameter to freely receive said second elongate hollow housing;
      (4) a sealing means mounted in the axial bore of the threaded neck and adapted to sealingly engage the external surface of the said second elongate housing when said housing is inserted through the neck:
      (5) a valve seat at the inner end of the said neck;
      (6) a valve cap;
      (7) means pivotally mounting the valve cap within the valve housing; and
      (8) spring means urging the valve cap into sealing engagement with the valve seat, said valve cap being displaceable to a position to permit entry of a portion of the second housing into the valve housing against the urging of said spring by the inward movement of the second elongate housing.

2. The invention defined in claim 1 further including means external of the valve housing assembly for sealing and unsealing the valve cap from the valve seat.

3. The invention defined in claim 2 wherein said external means includes a valve cap actuating shaft having an extended end passing through a sleeve bearing secured to the valve housing assembly.

4. The invention defined in claim 3 including O-ring sealing means between the shaft and the sleeve bearing.

5. The invention defined in claim 4 further including sealing means at the upper end of the elongate housing engaging the tape assembly as it moves through the housing.

* * * * *